US011201459B1

(12) United States Patent
Narasimha et al.

(10) Patent No.: US 11,201,459 B1
(45) Date of Patent: Dec. 14, 2021

(54) EFUSE FOR USE IN HIGH VOLTAGE APPLICATIONS

(71) Applicant: Motiv Power Systems, Inc., Foster City, CA (US)

(72) Inventors: Venkatesh Prasad Hanglur Narasimha, San Mateo, CA (US); James Michael Castelaz, Alameda, CA (US)

(73) Assignee: Motiv Power Systems, Inc., Foster City, GA (US)

( * ) Notice: Subject to any disclaimer, the term of this patent is extended or adjusted under 35 U.S.C. 154(b) by 0 days.

(21) Appl. No.: 16/865,273

(22) Filed: May 1, 2020

Related U.S. Application Data

(60) Provisional application No. 62/842,521, filed on May 2, 2019.

(51) Int. Cl.
| | | |
|---|---|---|
| *H02H 3/20* | (2006.01) | |
| *H02H 9/04* | (2006.01) | |
| *G08B 23/00* | (2006.01) | |
| *H02H 3/08* | (2006.01) | |
| *H02H 3/38* | (2006.01) | |
| *H02H 1/04* | (2006.01) | |
| *H02H 7/22* | (2006.01) | |

(52) U.S. Cl.
CPC .............. *H02H 3/20* (2013.01); *G08B 23/00* (2013.01); *H02H 3/08* (2013.01); *H02H 3/207* (2013.01); *H02H 3/38* (2013.01); *H02H 9/04* (2013.01); *H02H 1/04* (2013.01); *H02H 1/043* (2013.01); *H02H 7/22* (2013.01)

(58) Field of Classification Search
CPC ........ G08B 23/00; G08B 17/00; G08B 21/00; H02H 3/38; H02H 3/20; H02H 9/04; H02H 1/04; H02H 3/08; H02H 7/22; H02H 1/00; H02H 3/22; H02H 1/0069; H02H 1/043; H02H 3/027
USPC .................................. 361/86–87, 93.7–93.9
See application file for complete search history.

(56) References Cited

U.S. PATENT DOCUMENTS

| | | | | |
|---|---|---|---|---|
| 4,870,532 | A * | 9/1989 | Beatty, Jr | H02H 3/044 361/93.7 |
| 9,590,412 | B2 * | 3/2017 | Poulose | H02H 3/08 |
| 2012/0146782 | A1 * | 6/2012 | Komatsu | H03K 17/0822 340/501 |
| 2016/0226485 | A1 * | 8/2016 | Pritelli | H02H 3/087 |
| 2019/0109454 | A1 * | 4/2019 | Neyman | H03K 17/0822 |
| 2020/0366183 | A1 * | 11/2020 | Lam | H02J 9/005 |

* cited by examiner

*Primary Examiner* — Danny Nguyen
(74) *Attorney, Agent, or Firm* — Adibi IP Group, PC; Amir V. Adibi; Andrew C. Palmer

(57) ABSTRACT

An eFuse for use in high voltage applications is disclosed. In one embodiment, an apparatus includes a solid-state switch having source and drain terminals connected to switch a load current from a high voltage source through a high voltage load. The apparatus also includes a sense circuit that senses a voltage between the switch source and drain terminals and turns off the switch when the voltage exceeds a selected voltage level.

20 Claims, 6 Drawing Sheets

EFUSE FOR USE IN HIGH VOLTAGE APPLICATIONS

CROSS-REFERENCE TO RELATED APPLICATIONS

This application claims the benefit under 35 U.S.C. § 119 of U.S. Provisional Application No. 62/842,521, filed on May 2, 2019, and entitled "eFuse For Use In High Voltage Applications," which is incorporated by reference herein in its entirety.

TECHNICAL FIELD

The described embodiments relate to high voltage electronics, and more particularly, to an electronic fuse for protection of high voltage electronic systems.

BACKGROUND INFORMATION

High voltage direct current (DC) electronic systems, such as those used in electric vehicles, require protection in case of a short circuit or other malfunction. For example, it is desirable to have a protection device, such as a current limiting fuse, to protect connectors and other circuit components from exposure to high current during a short circuit.

However, using a high voltage DC fuse as a protection device brings with it several disadvantages. For example, there are not many high voltage DC fuses currently available so that the choice is limited. Also, high voltage DC fuses are expensive and increase system costs. Furthermore, fuses need to be replaced when blown, which adds replacement costs, system down time, and repair costs.

Therefore, it is desirable to have a protection device for high voltage applications that overcomes the problems associated with conventional high voltage fuses.

SUMMARY

In various exemplary embodiments, an electronic fuse (eFuse) is disclosed that provides current protection in high voltage applications. For example, the eFuse can be used to protect connectors and circuitry from high current levels due to failures in high voltage applications, such as in electric vehicle applications. In one example, high voltage is understood to mean voltage levels greater than 48 volts.

In one embodiment, the eFuse includes a switch and a sense circuit. The switch may be an N-type MOSFET solid state switch having very low "on" resistance. During operation, the switch is turned on to conduct a high voltage load current to a ground reference. For certain solid state MOSFET switches, the voltage between the drain and source is roughly proportional to the current flowing through the drain. The voltage level at the switch drain is sensed relative to its source and monitored to determine if it exceeds a selected threshold. The threshold voltage corresponds to a maximum current set-point. If the sensed voltage exceeds the reference, then the MOSFET switch is turned off. The maximum current has been exceeded and the eFuse is tripped. However, the eFuse can be reset without having to replace a device or requiring a special service call. The system can attempt to resolve the over-current condition and then can attempt to reset the eFuse back to its operating mode.

In an aspect, the voltage level across the switch is indicative of load current flowing through the switch. Thus, the switch is turned off when a desired current level is exceeded as indicated by the voltage level. The voltage level is selected to correspond to a desired load current level based on a characterization of the solid-state switch. In various embodiments, the same solid-state device is used to both switch and estimate the load current.

In an embodiment, when the eFuse is tripped, a high drain-to-source voltage may occur that could damage components of the sensing circuit. A high voltage diode is used to protect the sensing circuit. However, the high voltage diode introduces temperature variability. In an embodiment, both temperature variabilities are corrected using either a positive or negative temperature compensated thermistor in conjunction with a programmable voltage reference. Thus, as the temperature changes, variation in the output of the programmable voltage reference compensates for variations in the forward voltage of the high voltage diode to provide temperature stability.

In an exemplary embodiment, an apparatus is provided that includes a solid state switch having source and drain terminals connected in series with a high voltage source and a high voltage load such that a load current can flow from source to load when the switch is on but is prevented from flowing when the switch is off. The apparatus also includes a sense circuit that senses a voltage between the switch source and drain terminals and turns off the switch when the voltage exceeds a selected voltage level.

In an embodiment, a method is provided that comprises closing a switch that switches a load current from a high voltage source through a high voltage load, sensing the load current, and opening the switch when the voltage exceeds a selected voltage level.

In an embodiment, an apparatus is provided that comprises means for switching a load current from a high voltage source through a high voltage load. The means for switching comprises means for sensing a voltage produced by the load current. The apparatus also includes means for disconnecting the load current from the high voltage load when the voltage exceeds a selected voltage level.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some exemplary embodiments of the invention, examples of which are illustrated in the accompanying drawings.

Figure 1:
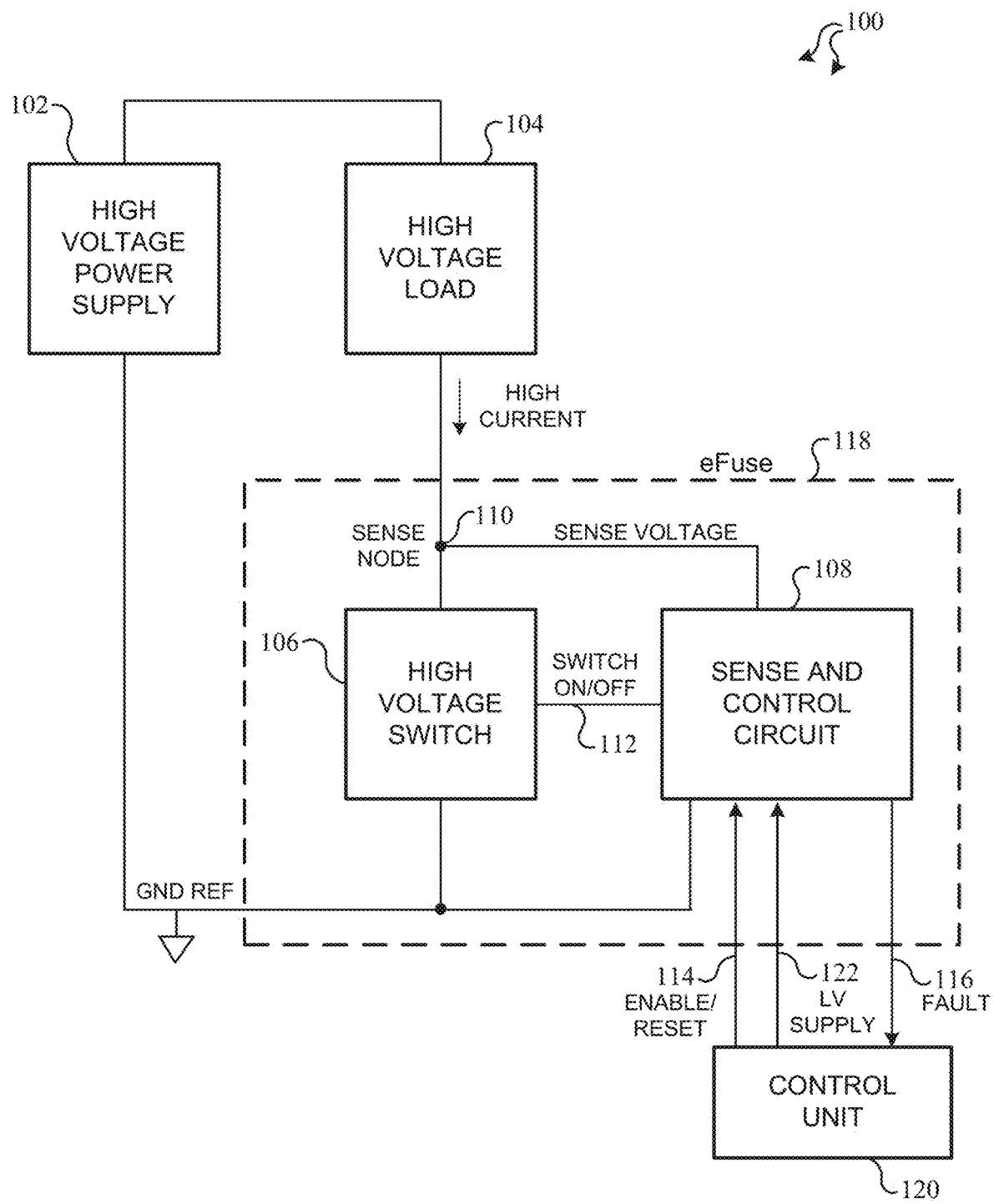
FIG. 1 is a diagram of a high voltage system that includes an exemplary embodiment of an eFuse.

FIG. 1 is a diagram of a high voltage system 100 that includes an exemplary embodiment of an eFuse 118. The system 100 includes a high voltage power supply 102, high voltage load 104, control unit 122, and the eFuse 118. The eFuse 118 includes a high voltage switch 106 and a sense and control circuit 108.

During operation, a high voltage output from the high voltage power supply 102 is applied to the load 104. A low voltage supply 122 from the control unit 120 is applied to the sense and control circuit 108. The high voltage switch 106 is placed in a first state (closed) so that it provides very low resistance to current flowing from the high voltage load to a ground reference (GND REF). For example, the control unit 122 outputs an enable/reset signal 114 to the sense and control circuit 108. In response, the sense and control circuit 108 places a switch on/off signal 112 in a high state that closes the switch 106 so that current can flow from the load 104 to the ground reference.

With the switch 106 closed, a large current can flow from the load 104 through the switch 106 to the ground reference. Due to the small resistance provided by the switch 106, a small sense voltage appears between a sense node 110 and the GND REF. This sense voltage is proportional to current flow and is input to the sense and control circuit 108.

The sense and control circuit 108 senses when the current flow through the switch 106 exceeds a threshold. For example, if there is a short circuit or low impedance in the load 104, the current flowing through the switch 106 may become so large that there is a risk of damage to connectors or other circuit components of the system 100. If the sense voltage indicates that the load current has exceeded the predefined threshold level, the sense and control circuit 108 places the switch on/off signal 112 in a low state to open the switch 106 (open state). The open state occurs regardless of the state of the enable/reset signal 114. With the switch 106 in the open state, current flow is stopped. This corresponds to the eFuse 118 being in the "tripped" state. The sense and control circuit 108 also outputs a fault indicator 116 to the control unit 122.

In response to the fault indicator 116, the control unit 122 may disable one or more system components responsible for the over-current. The control unit 122 may reset the enable/reset signal 114 to transition the eFuse 118 out of the tripped state and then set the enable/reset signal 114 to cause the sense and control circuit 108 to set the switch on/off signal to place the switch 106 back into the first (closed) state. This transition effectively resets the eFuse 118 and allows current to flow through the load 104. If the over-current situation is still present, the eFuse 118 may enter the tripped state again. A more detailed description of the eFuse 118 is provided below.

Figure 2:
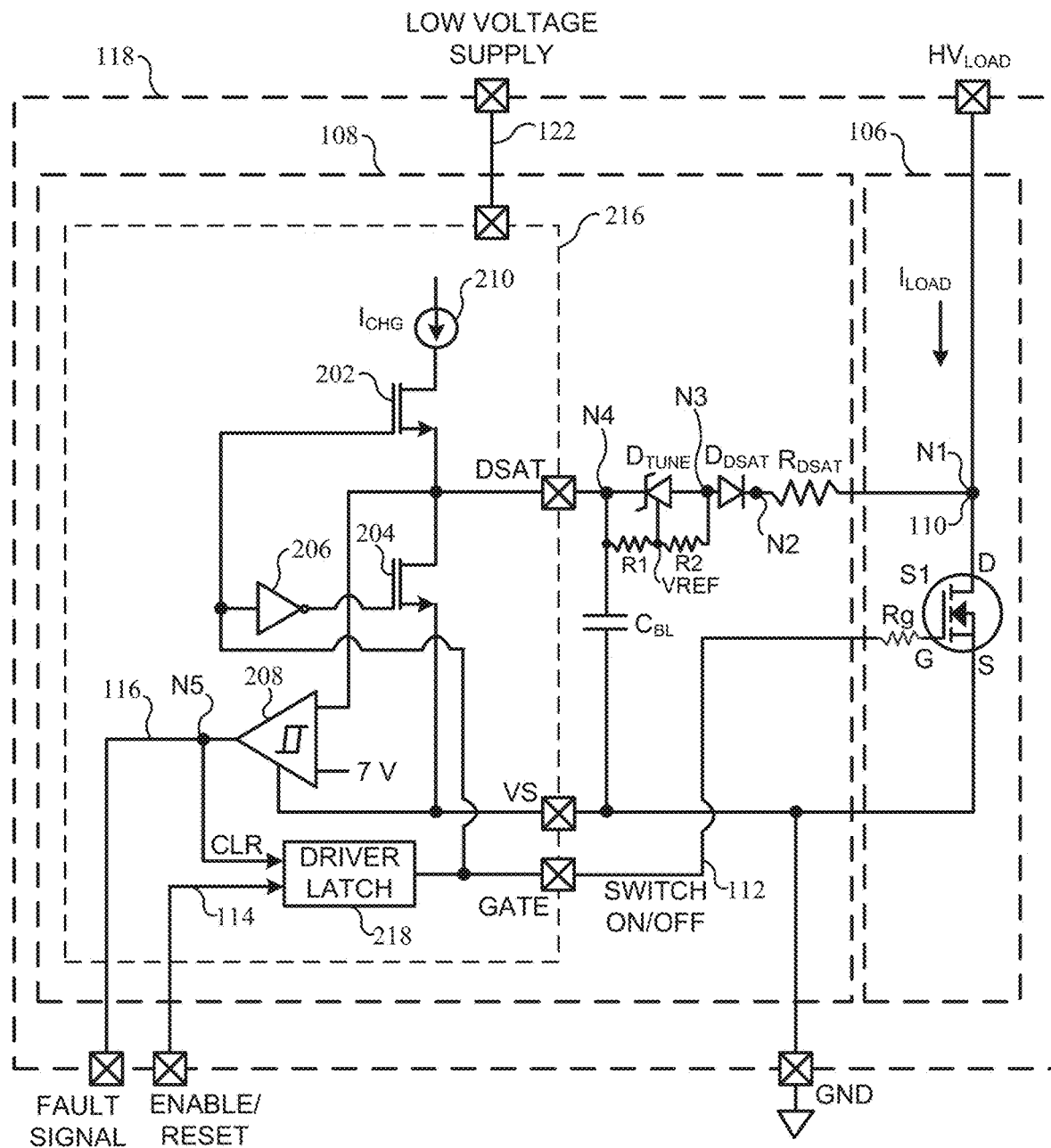
FIG. 2 shows a detailed embodiment of the eFuse shown in FIG. 1.

FIG. 2 shows a detailed embodiment of the eFuse 118 shown in FIG. 1. The eFuse 118 comprises the switch 106 and the sense and control circuit 108. In an embodiment, the switch 106 comprises a high power MOSFET transistor switch (S1). For example, the MOSFET switch S1 is rated for 100 amps and has an "on" resistance (RDS) of 0.013 ohms. In other embodiments, the solid-state switch (S1) is of a switch type selected from the group consisting of: an insulated-gate bipolar transistor (IGBT), a junction field effect transistor (JFET), a thyristor, or another solid-state switching device. In an aspect, the solid-state switch is formed from silicon, silicon carbide, or gallium nitride (GaN).

The sense and control circuit 108 comprises resistor $R_{DSAT}$, diode $D_{DSAT}$, voltage reference integrated circuit (IC) $D_{TUNE}$, resistors R1, R2, and capacitor $C_{BL}$ that provide voltage sensing functions. The sense and control circuit 108 also comprises integrated circuit 216 that provides control functions. In an embodiment, the components of the integrated circuit 216 are powered by the low voltage supply 122. The high voltage diode $D_{DSAT}$ withstands the voltage of the High Voltage Power Supply 102 when the MOSFET switch S1 is turned off (open).

The integrated circuit 216 comprises first transistor 202, second transistor 204, inverter 206, comparator 208, current source 210, and driver latch 218. The switch on/off signal 112 is output from the driver latch 218 and is connected to the gate of the transistor 202 and an input of the inverter 206. The switch on/off signal 112 is also connected through a GATE terminal to the gate of the MOSFET switch S1 via gate drive resistor Rg. When the enable/reset signal is high (set) and the eFuse is not in the tripped state, the switch on/off signal 112 is placed in a high level to cause the MOSFET switch S1 to turn on (first state). When the enable/reset signal 112 is low (reset) or the eFuse is in the tripped state, the switch on/off signal 112 is placed in a low level to cause the MOSFET switch S1 to turn off. An output of the inverter 206 is connected to a gate of the transistor 204. When the switch on/off signal 112 is low, the transistor 202 is turned off and the transistor 204 is turned on. When the switch on/off signal 112 is high, the transistor 202 is turned on and the transistor 204 is turned off. In another embodiment, the transistors 202 and 204 are replaced with a diode from the voltage sense terminal (DSAT) to the low voltage supply 122.

The comparator 208 has a first input connected to a reference voltage (e.g., 7 volts) and a second input connected to a DSAT pin of the integrated circuit 216. The DSAT pin can also be referred to as a "voltage sense terminal." When the signal at the DSAT pin exceeds the reference voltage, the comparator will output a high level that represents the fault signal 116. In an embodiment, the comparator 208 includes hysteresis to prevent rapid changes on its output.

During operation, the control unit 122 outputs the enable/reset signal 114 to the driver latch 218 so that the switch on/off signal 112 is placed in a high level to cause the MOSFET switch S1 to turn on (first state). In the first state, the MOSFET switch S1 provides a very low on resistance so that the load current $I_{LOAD}$ results in a small voltage appearing at the node N1 (e.g., sense node 110). At this point it will be assumed that the load current is very small so that the voltage at node N1 is near zero.

When the enable/reset signal 114 is high, the transistor 204 is turned off, which uncouples the DSAT pin from ground. The high level of the switch on/off signal 112 also turns on transistor 202, which allows charging current ($I_{CHG}$) to flow to the DSAT pin and to begin charging the capacitor $C_{BL}$. In an embodiment, the charging current ($I_{CHG}$) is 1 milliamp (mA).

As the capacitor $C_{BL}$ begins to charge, the voltage at node N3 increases until the diode $D_{DSAT}$ is forward biased. At this point, some of the $I_{CHG}$ current begins to flow through the diode $D_{DSAT}$ and through the resistor $R_{DSAT}$ toward the node N1. This current is small when compared to the load current $I_{LOAD}$, so that the voltage at node N1 is essentially determined by the load current $I_{LOAD}$ and the RDS ON resistance of the MOSFET switch S1.

The voltage reference IC $D_{TUNE}$ is programmable using the resistors R1, R2. For example, the output voltage of $D_{TUNE}$ is determined from [Vout=(1+R1/R2)*VREF]. In an embodiment, the voltage VREF is fixed at 1.24 volts. The value of the resistor R1 is set to 22.2 kOhms and the value of the resistor R2 is set to 10 kOhms. Also, $R_{DSAT}$ is set to 1000 Ohms. Given these parameters, $D_{TUNE}$ is programmed to 4 volts.

The capacitor $C_{BL}$ continues to charge until the voltage at node N3 is stable at approximately 1.7 volts above the voltage at node N1. For example, if the current $I_{CHG}$ is 1 milliamp (ma) and the resistance of the resistor $R_{DSAT}$ is 1000 ohms, then the voltage across the resistor $R_{DSAT}$ will be one volt. Since the forward voltage of the diode $D_{DSAT}$ is approximately 0.7 volts, the voltage at the N3 will be 1.7 volts above the voltage at node N1. The voltage at the DSAT pin (N4) is 4 volts above the voltage at N3. Thus, the voltage at the DSAT pin is 5.7 volts above the voltage at N1.

As the voltage at the node N1 changes due to the changing load current $I_{LOAD}$, the voltage at the DSAT pin will also change. For example, with a load current of 40 amps and an MOSFET RDS of 0.013 ohms, the voltage at the node N1 will be approximately 0.5 volts. The voltage at the DSAT pin will be approximately 6.2 volts. Since this level is below the 7 volt reference at the comparator input, the comparator 208 will not trigger.

For the comparator 208 to trigger, the voltage at the DSAT pin should be greater than 7 volts. This effectively sets the load current set-point that determines when the eFuse is tripped. For example, for the voltage at the DSAT pin to be 7 volts, the voltage at N1 needs to be 1.3 volts. With an RDS ON resistance of 0.013 ohms, the load current set-point is [1.3/0.013=100 amps]. Thus, if the load current $I_{LOAD}$ increases to 100 amps, due to a short circuit or other malfunction, then the voltage at N1 will exceed 1.3 volts and the voltage at the DSAT pin will exceed 7 volts, thereby triggering the comparator 208 to activate the fault signal 116 indicating that the load current set-point has been exceeded (e.g., the eFuse has been tripped).

The fault signal 116 acts as a clear signal to the driver latch 218, which places the switch on/off signal 112 to a low state, and thereby turning off the MOSFET switch S1.

To prevent repeated fault signals 214 when the DSAT pin is near the 7 volt threshold, the comparator 208 provides some level of hysteresis so that once the comparator is tripped, the voltage at the DSAT pin needs to fall well below the 7 volt threshold to change the state of the fault signal 116.

Once the MOSFET switch S1 is turned off and the eFuse is in the tripped state, the control unit 122 can reset and then set the enable/reset signal 112 to take the eFuse out of the tripped state and then turn the MOSFET switch S1 back on once the problem that caused the overcurrent condition has been rectified. In this regard, the sense and control circuit 216 is resettable, since the comparator 208 resets when the load current $I_{LOAD}$ returns to a level below the 100 amp threshold but the driver latch 218 continues to hold the switch on/off signal 112 in the off state until the enable/reset signal 114 is reset. It is possible to reset the sense circuit by pulling the sense enable/reset signal 114 low, which will clear the driver latch 218 and set transistor 204 and thereby coupled the DSAT pin to VS. This discharges the capacitor $C_{BL}$ and resets the circuit.

Figure 3:
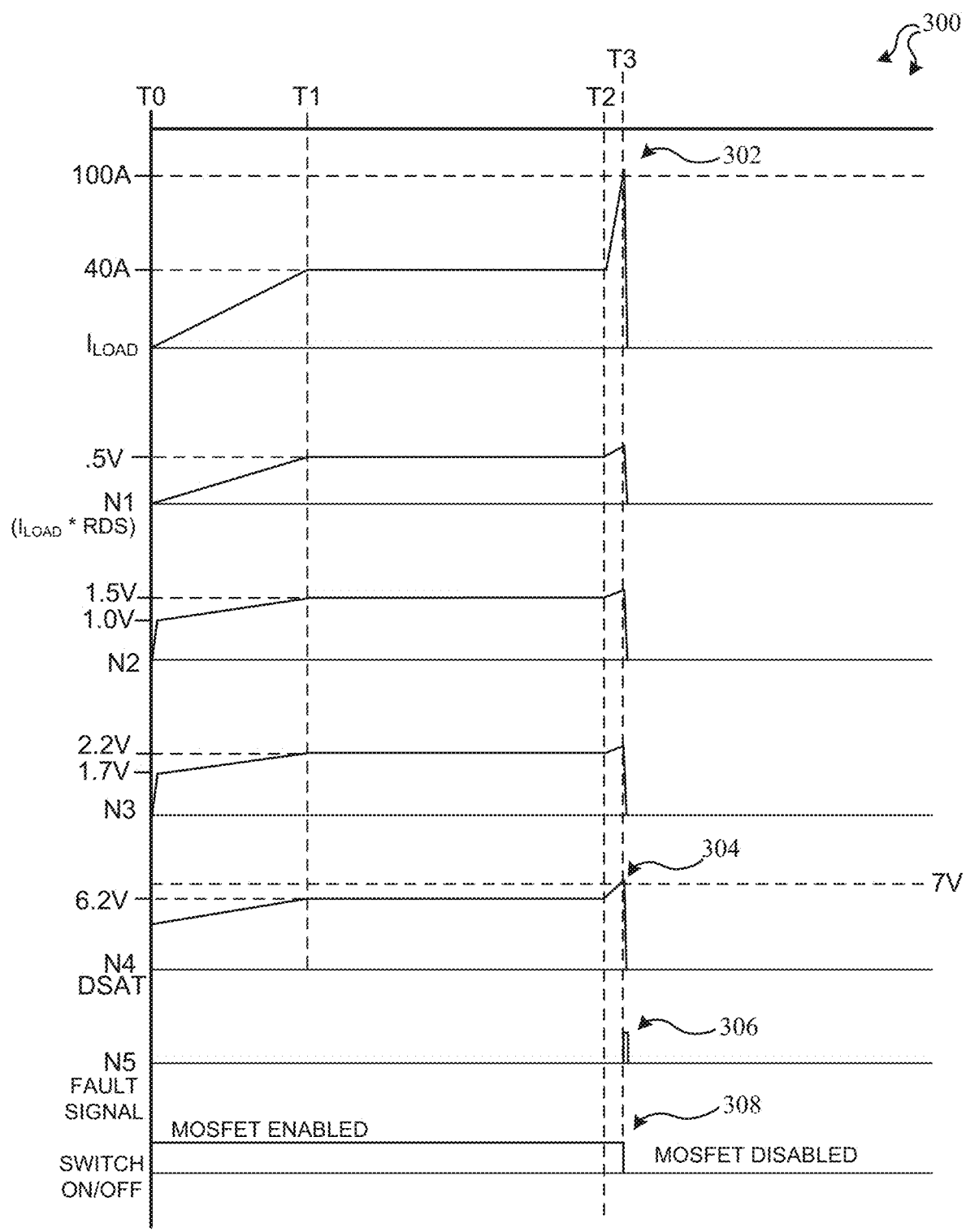
FIG. 3 shows a timing diagram that illustrates the operation of the eFuse shown in FIG. 2.

FIG. 3 shows a timing diagram 300 that illustrates the operation of the eFuse 118 shown in FIG. 2. For example, the timing diagram 300 illustrates how the eFuse 118 disables current flow (e.g., enters a tripped state) once a pre-determined set-current has been reached.

At time T0, the switch on/off signal 112 is set to a high level to enable the MOSFET switch S1 to conduct load current. For example, the control unit 122 outputs the enable/reset signal 114 to set the driver latch 218 to set the switch on/off signal 112 to a high level, which enables the MOSFET switch S1. The switch on/off signal 112 turns on the transistor 202 and turns off the transistor 204. This allows the reference current ($I_{CHG}$) to flow to the DSAT terminal, thereby allowing the capacitor $C_{BL}$ to begin charging.

During the time interval T0-T1, the load current increases to 40 amps. As the load current increases, the voltage at node N1 increases proportionately. For example the voltage at node N1 is the product of the load current ($I_{LOAD}$) and the RDS ON resistance (0.013 Ohms) of the MOSFET switch S1. The voltage at node N2 also increases with node N1.

During the time interval T1-T2, the load current stabilizes at 40 amps, the voltages at node N1 stabilizes at 0.5 volts, and the voltage at N2 stabilizes at 1.5 volts. It should be noted that between T1 and T2 the load current can fluctuate but remains below the trip point of 100 amps. For clarity, it will be assumed that the load current is stable at 40 amps.

During the time interval T0-T1, the voltage at the node N3 increases to 2.2 volts, and the voltage at the DSAT terminal increases to 6.2 volts (e.g., 4 volts above N3). For example, the voltage at the DSAT terminal corresponds to the level of the load current, which has stabilized at 40 amps.

At time T3, due to a short circuit or other failure condition, the load current rises above 100 amps, as indicated at 302. This high current level causes the voltage at the DSAT terminal to exceed 7 volts, as indicated at 304. The voltage at the DSAT terminal causes the comparator 208 to set the fault signal 116 to a high level, as indicated at 306. The driver latch 218 responds to the high level of the fault signal 116 and sets the switch on/off signal 112 to a low level, as indicated at 308. This disables the MOSFET switch S1. Thus, the load current level has exceeded the predetermined set-point and the eFuse has tripped (e.g. disabled the switch S1).

After time T3, the cause of the current spike is corrected and the sensing circuit and the MOSFET switch can be reset by the control unit 122 to reset the eFuse.

Figure 4:
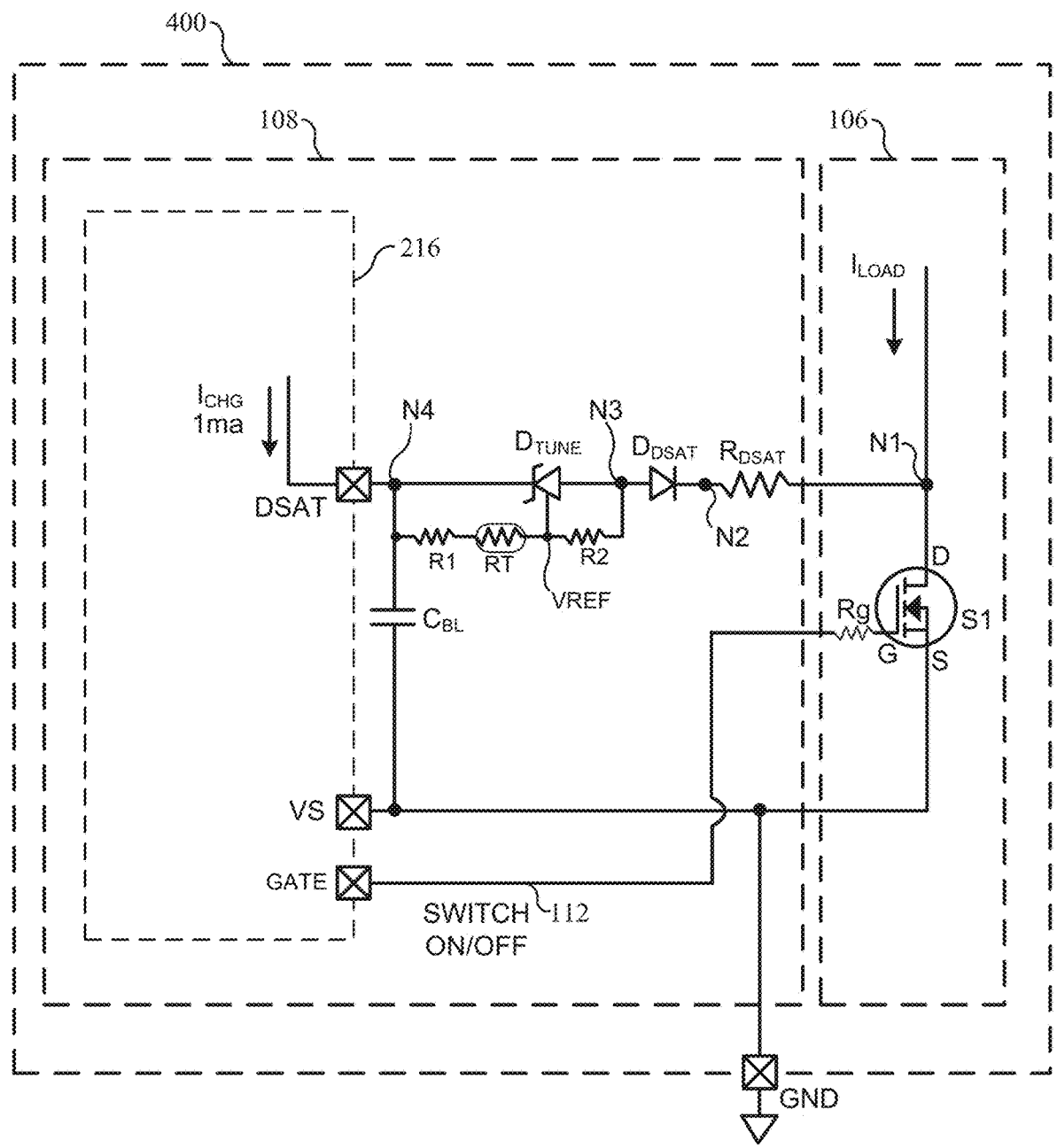
FIG. 4 shows an alternative embodiment of the eFuse shown in FIG. 2.

FIG. 4 shows an alternative embodiment of an eFuse 400. For example, the eFuse 400 is similar to the eFuse 118 shown in FIG. 2, except that temperature compensation is added. For clarity, the eFuse 400 does not show selected components to make the figure easier to understand.

The eFuse 400 includes temperature compensation that may be necessary because the forward voltage drop of $D_{DSAT}$ may be dependent on its operating temperature, and thus the over-current limit of the eFuse may change as its operating temperature changes. This is not desirable in applications where the system requires a constant over-current limit across a wide operating temperature range. For example, the diode $D_{DSAT}$ is a high voltage diode having a forward voltage that varies with temperature. To compensate for this, the eFuse 400 includes a positive temperature coefficient (PTC) thermistor RT connected between the resistor R1 and the node VREF. For example, in FIG. 2 the value of R1 is 22.5 kOhm. In this embodiment, the value of R1 is reduced to 12.5 kOhm and the thermistor RT has a value of 10 kOhm for a total 22.5 kOhm. As the temperature changes, the thermistor resistance will change thereby changing the set voltage of the voltage reference IC $D_{TUNE}$ to compensate for the changing forward voltage of the diode $D_{DSAT}$. As a result, the voltage at the DSAT terminal will reflect the amount of load current independent from the temperature changes. In another embodiment, a negative temperature coefficient (NTC) thermistor can be inserted between the VREF node and R2, and the value of R2 adjusted to accomplish the same result.

Figure 5:
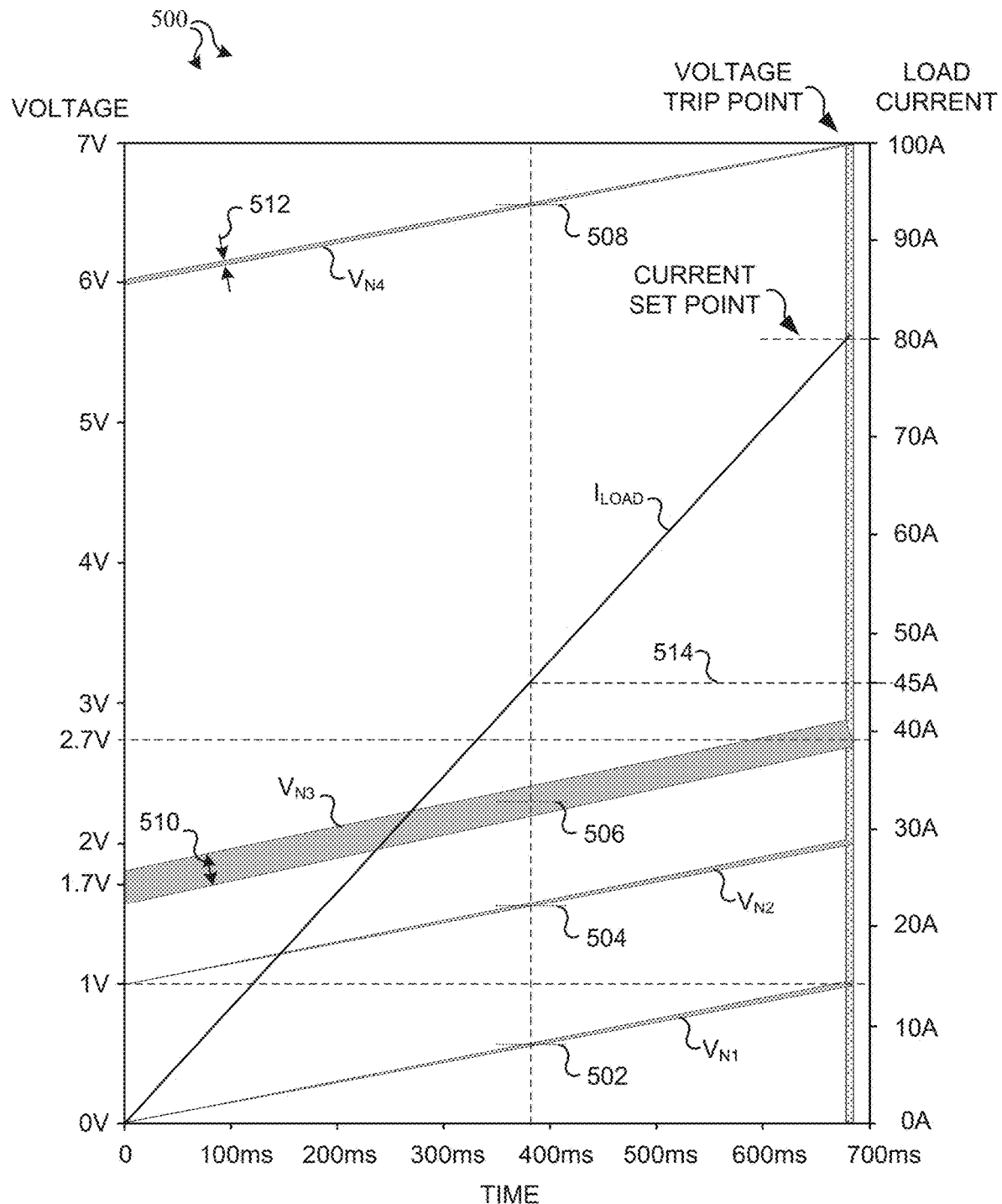
FIG. 5 shows a timing diagram that illustrates the operation of the eFuse with temperature compensation shown in FIG. 4 to protect a high voltage circuit.

FIG. 5 shows a timing diagram 500 that illustrates the operation of the eFuse 400 with temperature compensation as shown in FIG. 4 to protect a high voltage circuit. It will be assumed that the eFuse 400 is set to trip at 80 amps of load current. To enable this current set point, the programmable voltage reference $D_{TUNE}$ will be programmed to a voltage of 4.3 volts. For example, values for the resistors R1, R2 and thermistor RT will be selected to set $D_{TUNE}$ to a voltage of 4.3 volts.

During operation, the switch on/off signal 112 is set to a high level to turn on switch S1. At the same time the charging current $I_{CHG}$ begins to charge the capacitor $C_{BL}$. It will be assumed that the capacitor $C_{BL}$ fully charges before the eFuse can be tripped.

At time 0, with the switch S1 on and the capacitor $C_{BL}$ fully charged, the charge current $I_{CHG}$ flows through the sense circuit so that the voltage $V_{N1}$ at node N1 is approximately zero, the voltage $V_{N2}$ at node N2 is approximately 1 volt, the voltage $V_{N3}$ at node N3 is approximately 1.7 volts and the voltage $V_{N4}$ at node N4 is approximately 6 volts. For example, $V_{N2}$ is 1 volt above $V_{N1}$, $V_{N3}$ is 0.7 volts above $V_{N2}$, and $V_{N4}$ is 4.3 volts above $V_{N3}$.

As the load current $I_{LOAD}$ begins to increase, the voltages at each of the nodes also increase. When the load current reaches 40 amps (indicated at 514), the voltage at $V_{N1}$ (indicated at 502) is 0.52 volts as determined by the load current and the on-state resistance of the switch S1 (e.g., 40*0.013=0.52 volts). The voltage at $V_{N2}$ (indicated at 504) is 1.52 volts, the voltage at $V_{N3}$ (indicated at 506) is 2.27 volts, and the voltage at $V_{N4}$ (indicated at 508) is 6.57 volts.

Due to the temperature sensitivity of the high voltage diode $D_{DSAT}$, there is a substantial variation in the voltage $V_{N3}$ as indicated at 510. However, the temperature compensation provided by the thermistor connected to the programmable voltage IC $D_{TUNE}$ operates to compensate the variation in the voltage $V_{N3}$ such that a much smaller variation (indicated at 512) appears on the voltage $V_{N4}$.

When the load current reaches and exceeds 80 amps, the voltage $V_{N4}$ reaches and exceeds 7 volts. This trips the comparator 208 to generate the fault signal 116 and to set the switch on/off signal 122 to a low level that turns off the switch S1 (e.g., the eFuse trips). The eFuse 400 can be reset by the control unit 120. Thus, the temperature compensated programmable voltage IC $D_{TUNE}$ compensates for the temperature sensitivity of the diode $D_{DSAT}$, and thereby provides accurate eFuse operation over a large temperature range.

Figure 6:
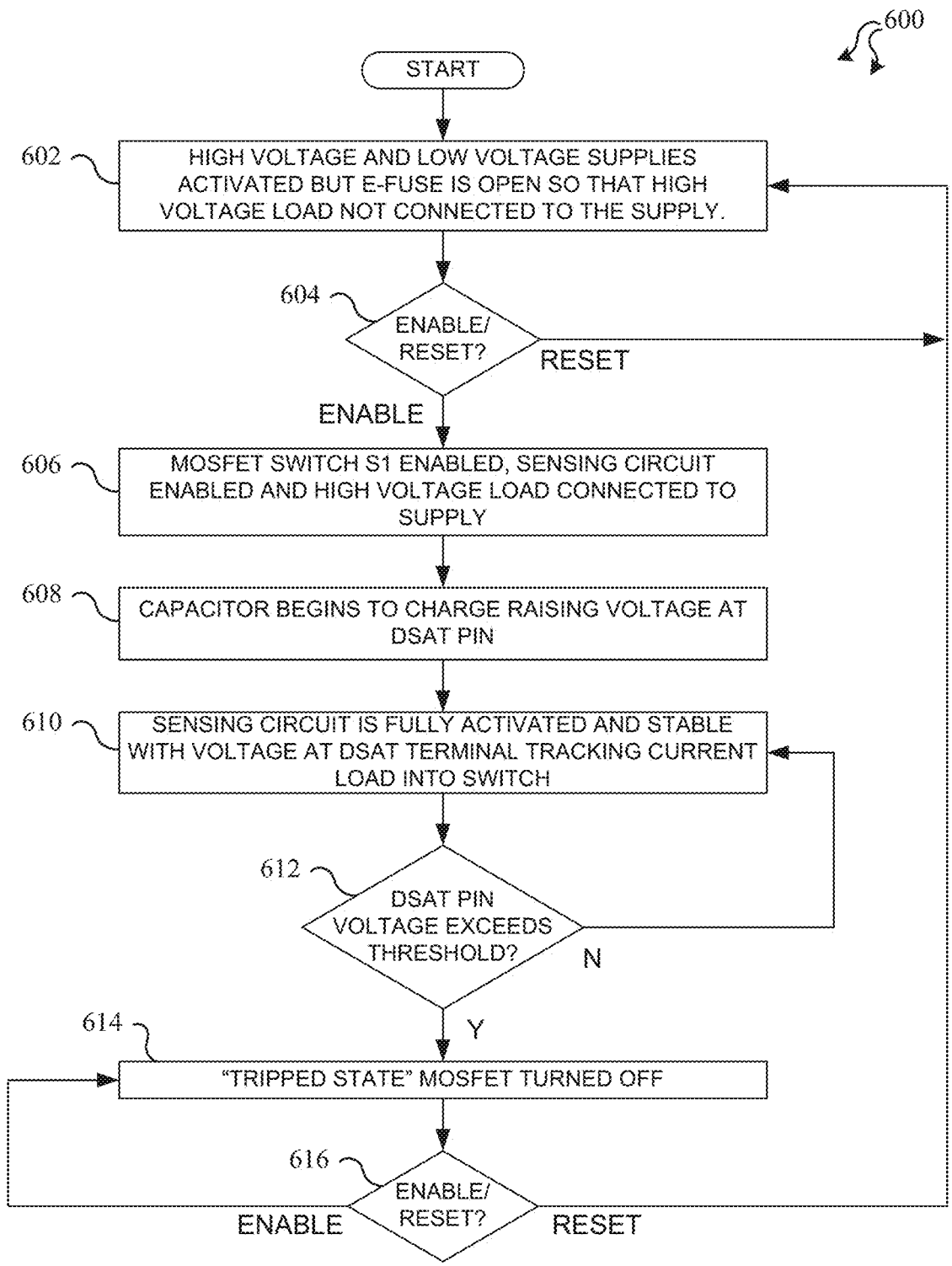
FIG. 6 shows an embodiment of a method for providing an eFuse in a high voltage circuit.

FIG. 6 shows an embodiment of a method 600 for providing an eFuse in a high voltage circuit. For example, the method 600 is suitable for use with the eFuse 118 shown in FIG. 2.

At block 602, high-voltage and low voltage supplies are activated to supply high voltage power to a high voltage load and to supply low voltage power to a sense and control circuit. For example, the low voltage supply provides power to the integrated circuit 216. At this time the switch S1 is open so that the HV load is not connected to the HV supply. For example, the high voltage power supply 102 outputs a high voltage to the high voltage load 104.

At block 604, a determination is made as to the state of an enable/reset signal. For example, if the state of the enable/reset signal 114 output from the control unit 120 is in the reset state, the method proceeds to block 602. If the state of the enable/reset signal 114 output from the control unit 120 is in the enable state, the method proceeds to block 606.

At block 606, the MOSFET switch S1 is enabled. For example the control unit 120 outputs the enable/reset signal 114 to the driver latch 218. The driver latch 218 outputs a high level on the switch on/off signal 112 to drive the gate of the MOSFET switch S1. This enables switch S1 to conduct load current to the ground reference. The MOSFET switch has a very small on-state resistance of 0.013 ohms, which generates a voltage at the node N1 that is proportional to the load current. The sensing circuit 108 is also enabled. For example, the transistor 202 is turned on and the transistor 204 is turned off. This allows the charge current ($I_{CHG}$) to flow to the DSAT terminal.

At block 608, the capacitor $C_{BL}$ begins to charge, raising the voltage at the DSAT terminal. For example the charge current from the charging reference 210, which is set to 1 mA, flows through the DSAT terminal to the capacitor $C_{BL}$.

At block 610, the sensing circuit is fully activated and stable with the voltage at the DSAT terminal tracking the load current into the switch S1.

At block 612, a determination is made as to whether the voltage at the DSAT terminal exceeds a threshold voltage of seven volts. For example the comparator 208 compares the voltage at the DSAT terminal to a 7 volt reference voltage. If the voltage at the DSAT terminal does not exceed the threshold, then the load current is less than the current set point and the method proceeds to block 610. If the voltage at the DSAT terminal exceeds the threshold then the load current exceeds the current set point and the method proceeds to block 614.

At block 614, the eFuse has entered the "tripped" state and the MOSFET switch S1 is disabled. For example, the comparator 208 generates the fault signal 116 as a result of the voltage at the DSAT terminal being greater than 7 volts. The fault signal 116 clears the driver latch 218, which sets the switch on/off signal 112 to a low voltage. The low voltage on the switch on/off signal 112 turns off the MOSFET switch S1 to stop the current flow.

At block 616, a determination is made as to the state of an enable/reset signal. For example, if the state of the enable/reset signal 114 output from the control unit 120 is in the reset state, the method proceeds to block 602. If the state of the enable/reset signal 114 output from the control unit 120 is in the enable state, the method proceeds to block 614.

Once the eFuse is tripped, the switch S1 remains open until the control unit 120 resets and then enables the enable/reset signal 114.

Thus, the method 600 operates to provide an eFuse in a high voltage circuit. It should be noted that the operations of the method 600 are exemplary, and not exhaustive, and that the operations may be changed, modified, rearranged, deleted, and/or added to within the scope of the embodiments.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. An apparatus comprising:
   a solid-state switch having source and drain terminals connected to switch a load current from a high voltage source through a high voltage load;
   a sense circuit that senses a voltage between the source and drain terminals and turns off the solid-state switch when the voltage exceeds a selected voltage level;
   a diode coupled between a voltage sense terminal and the drain terminal; and a capacitor having a first terminal connected to the voltage sense terminal and a second terminal coupled to the source terminal.

2. The apparatus of claim 1, wherein the selected voltage level is selected to correspond to a desired load current level based on a characterization of the solid-state switch.

3. The apparatus of claim 1, wherein the solid-state switch has a gate terminal that is connected to the sense circuit to selectively turn on and off the solid-state switch.

4. The apparatus of claim 1, wherein the solid-state switch is an enhancement mode N-type MOSFET transistor.

5. The apparatus of claim 1, wherein the sense circuit comprises:
a comparator having a first input terminal connected to the voltage sense terminal, a second input terminal connected to a reference voltage, and an output terminal that outputs a fault indicator.

6. The apparatus of claim 1, wherein a voltage at the voltage sense terminal indicates a level of the load current.

7. An apparatus comprising:
a solid-state switch having source and drain terminals connected to switch a load current from a high voltage source through a high voltage load;
a sense circuit that senses a voltage between the source and drain terminals and turns off the solid-state switch when the voltage exceeds a selected voltage level; and
a diode coupled between a voltage sense terminal and the drain terminal, wherein the sense circuit comprises:
a first control switch that selectively connects the voltage sense terminal to the source terminal in response to a control signal.

8. The apparatus of claim 7, wherein the selected voltage level is selected to correspond to a desired load current level based on a characterization of the solid-state switch.

9. The apparatus of claim 7, wherein the solid-state switch has a gate terminal that is connected to the sense circuit to selectively turn on and off the solid-state switch.

10. The apparatus of claim 7, wherein the solid-state switch is an enhancement mode MOSFET transistor.

11. An apparatus comprising:
a solid-state switch having source and drain terminals connected to switch a load current from a high voltage source through a high voltage load;
a sense circuit that senses a voltage between the source and drain terminals and turns off the solid-state switch when the voltage exceeds a selected voltage level; and
a diode coupled between a voltage sense terminal and the drain terminal, wherein the sense circuit comprises:
one of a control switch or diode that selectively connects a reference current to the voltage sense terminal in response to a control signal.

12. The apparatus of claim 11, wherein the sense circuit further comprises:
a current source that generates the reference current.

13. An apparatus comprising:
a solid-state switch having source and drain terminals connected to switch a load current from a high voltage source through a high voltage load;
a sense circuit that senses a voltage between the source and drain terminals and turns off the solid-state switch when the voltage exceeds a selected voltage level;
a diode coupled between a voltage sense terminal and the drain terminal; and
a voltage reference connected in series with the diode, wherein a voltage drop across the voltage reference is set by at least one external thermistor.

14. A method, comprising:
closing a switch that switches a load current from a high voltage source through a high voltage load;
sensing, at a node, a voltage produced by the load current;
opening the switch when the voltage exceeds a selected voltage level;
coupling a programmable voltage reference and a diode in series between the node and a voltage sense terminal; and
adding temperature compensation to the programmable voltage reference to compensate for temperature sensitivity of the diode.

15. The method of claim 14, further comprising:
selecting the selected voltage level to correspond to a desired load current level based on a characterization of the switch.

16. The method of claim 14,
wherein a voltage at the voltage sense terminal is compared to a reference voltage
and the switch is opened when the voltage at the voltage sense terminal exceeds the reference voltage.

17. The method of claim 16, further comprising:
outputting a fault signal when the switch is opened.

18. The method of claim 14, wherein the selected voltage level is selected to correspond to a desired load current level based on a characterization of the switch.

19. The method of claim 14, wherein the switch has a gate terminal that is connected to selectively turn on and off the switch.

20. The method of claim 14, wherein the switch is an enhancement mode MOSFET transistor.

* * * * *